(12) United States Patent
Rodriguez Bravo et al.

(10) Patent No.: US 11,082,756 B2
(45) Date of Patent: Aug. 3, 2021

(54) CROWDSOURCE RECORDING AND SHARING OF MEDIA FILES

(71) Applicant: International Business Machines Corporation, Armonk, NY (US)

(72) Inventors: Cesar Augusto Rodriguez Bravo, Alajuela (CR); Shikhar Kwatra, Durham, NC (US); Adam Lee Griffin, Dubuque, IA (US); Kevin Jimenez Mendez, San Francisco (CR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/451,039

(22) Filed: Jun. 25, 2019

(65) Prior Publication Data
US 2020/0413161 A1    Dec. 31, 2020

(51) Int. Cl.
*H04N 21/85*    (2011.01)
*H04L 29/06*    (2006.01)
*G06F 16/44*    (2019.01)

(52) U.S. Cl.
CPC .............. *H04N 21/85* (2013.01); *G06F 16/44* (2019.01); *H04L 65/4076* (2013.01)

(58) Field of Classification Search
None
See application file for complete search history.

(56) References Cited

U.S. PATENT DOCUMENTS

| | | |
|---|---|---|
| 9,325,930 B2 | 4/2016 | Boss |
| 9,888,296 B2 | 2/2018 | Marck |
| 9,947,364 B2* | 4/2018 | Kanevsky ........ G11B 20/10527 |
| 10,083,618 B2 | 9/2018 | Ukelson |
| 10,187,666 B2 | 1/2019 | Chang |
| 2011/0319096 A1* | 12/2011 | Rothschild ............ H04W 4/029 455/456.1 |

(Continued)

FOREIGN PATENT DOCUMENTS

EP    3209034 A1    8/2017

OTHER PUBLICATIONS

"970", Sound Devices, printed Jun. 20, 2019, <https://www.sounddevices.com/product/970/>, 6 pages.
"How to take Sound & shot photos on Samsung Galaxy S6?", SoftwareRT, <https://www.softwarert.com/sound-shot-photos-samsung-galaxy-s6/>, printed Jun. 20, 2019, 5 pages.

(Continued)

*Primary Examiner* — Joshua Joo
(74) *Attorney, Agent, or Firm* — Joseph P. Curcuru; Gilbert Harmon, Jr.

(57) ABSTRACT

Embodiments describe an approach for crowdsource recording and sharing of media files. Embodiments identify one or more extended audio sources, wherein the one or more extended audio sources are one or more internet of things (IOT) extended audio devices and pair a IOT video capture device with the one or more IOT extended audio devices. Further, embodiments, synchronize an audio recording on the one or more IOT extended audio devices with digital imagery capture on the IOT video capture device and save, the captured digital imagery as one or more media files and the recorded audio as one or more audio files. Additionally, embodiments, process the one or more media files and the one or more audio files by integrating the one or more audio files into the one or more media files and output the processed media file to the IOT video capture device.

20 Claims, 5 Drawing Sheets

(56) References Cited

U.S. PATENT DOCUMENTS

| | | | | |
|---|---|---|---|---|
| 2013/0185774 | A1* | 7/2013 | Morelli, Jr. | G06F 21/31 |
| | | | | 726/4 |
| 2016/0021485 | A1* | 1/2016 | Sallas | H04W 8/005 |
| | | | | 455/41.3 |
| 2016/0337773 | A1 | 11/2016 | Tsilfidis | |
| 2017/0163637 | A1* | 6/2017 | Peterson | H04L 63/0861 |
| 2017/0243615 | A1* | 8/2017 | Tabak | G11B 27/28 |
| 2018/0097856 | A1* | 4/2018 | Dange | G06Q 10/10 |
| 2018/0152736 | A1* | 5/2018 | Alexander | H04N 21/41407 |
| 2018/0158922 | A1* | 6/2018 | Marek | C23C 14/185 |
| 2018/0160251 | A1 | 6/2018 | Sanger | |
| 2018/0205872 | A1* | 7/2018 | Feltham | H04N 5/765 |
| 2018/0350405 | A1* | 12/2018 | Marco | G11B 27/031 |
| 2019/0089456 | A1* | 3/2019 | Kasilya Sudarsan | |
| | | | | H04M 1/72412 |
| 2019/0166074 | A1* | 5/2019 | Voss | H04L 51/16 |
| 2019/0281389 | A1* | 9/2019 | Gordon | G06F 3/167 |

OTHER PUBLICATIONS

"pikSpeak Camera—photo sound", Apps on Google Play, <https://play.google.com/store/apps/details?id=com.pikspeak.www&hl=en_US>, printed Jun. 19, 2019, 3 pages.

Chaykowski, Kathleen, "Digital Video Marketing is a $135 Billion Industry in the U.S. Alone, Study Finds", Forbes, Oct. 18, 2017, <https://www.forbes.com/sites/kathleenchaykowski/2017/10/18/digital-video-marketing-is-a-135-billion-industry-in-the-u-s-alone-study-finds/#1b61580fd4dd>, 8 pages.

Dove, Jackie, "10 iOS apps that make your pictures talk", TNW, May 27, 2014, <https://thenextweb.com/creativity/2014/05/27/7-talking-camera-apps-focus-lens-multimedia/>7 pages.

Mell et al., The NIST Definition of Cloud Computing, NIST, National Institute of Standards and Technology, Special Publication 800-145, Sep. 2011, 7 pages.

Van Buskirk, Eliot, "OutListen's Crowdsourced Concert Videos: A New Music Format", Wired, Jan. 12, 2012, <https://www.wired.com/2012/01/outlisten-crowdsourced-concert-videos/>, 9 pages.

* cited by examiner

CROWDSOURCE RECORDING AND SHARING OF MEDIA FILES

BACKGROUND OF THE INVENTION

The present invention relates generally to the field of crowdsourcing data, and more particularly to improving the recording and sharing of media files through crowdsourcing.

Audio recording, videography, and photography have become an integral part of everyday life. Mobile devices (e.g., smartphones) enable users to record or photograph almost every experience or aspect of the user's life. The advancement in mobile photography and videography has enabled users to record and share memories and experiences with other users. In various ways, the shared memories and experiences connect users that may never have previously connected. Users that attend an event although experiencing the same event might have different visual views of the event. For example, one person is in orchestra seating and another person is seated on a balcony. Each person taking photos or video will have different angles, vantage points, and/or audio.

SUMMARY

Embodiments of the present invention disclose a method, a computer program product, and a system for crowdsource recording and sharing of media files, comprising identifying, by one or more processors, one or more extended audio sources, wherein the one or more extended audio sources are one or more internet of things (IOT) extended audio devices; pairing, by the one or more processors, a IOT video capture device with the one or more IOT extended audio devices; synchronizing, by the one or more processors, an audio recording on the one or more IOT extended audio devices with digital imagery capture on the IOT video capture device; saving, by the one or more processors, the captured digital imagery as one or more media files and the recorded audio as one or more audio files; processing, by the one or more processors, the one or more media files and the one or more audio files by integrating the one or more audio files into the one or more media files; and outputting, by the one or more processors, the processed media file to the IOT video capture device.

DETAILED DESCRIPTION

There are problems when capturing photos or videos from a distance, for example, you can zoom to get a better picture; however, users are not able to zoom in to capture sound (i.e., audio). For example, two people are at a concert, the first person is in the front row and the second person is all the way in the back on the lawn. In this particular example, both people experienced the event and each person has a different view of the concert and different audio.

Embodiments of the present invention can virtually extend audio ranges, via internet of things (IOT) devices and crowdsourcing for improved media file assembly and distribution among users or groups of users based on a dynamic correlation of the media files with data ingestion schemes. Data ingestion is the process of obtaining and importing data for immediate use or storage in a database. Data can be streamed in real-time or ingested in batches. When data is ingested in real time, each data item is imported as it is emitted by the source. When data is ingested in batches, data items are imported in discrete chunks at periodic intervals of time. An effective data ingestion process begins by prioritizing data sources, validating individual files, and routing data items to the correct destination. The term data, as used herein, can refer to media files. Media files can be, but are not limited to, video files, image files, audio files, and any other media files known in the art. Audio files can comprise external/extended sound. In various embodiments, an IOT device can capture digital imagery, in which the digital imagery is saved as a media file.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
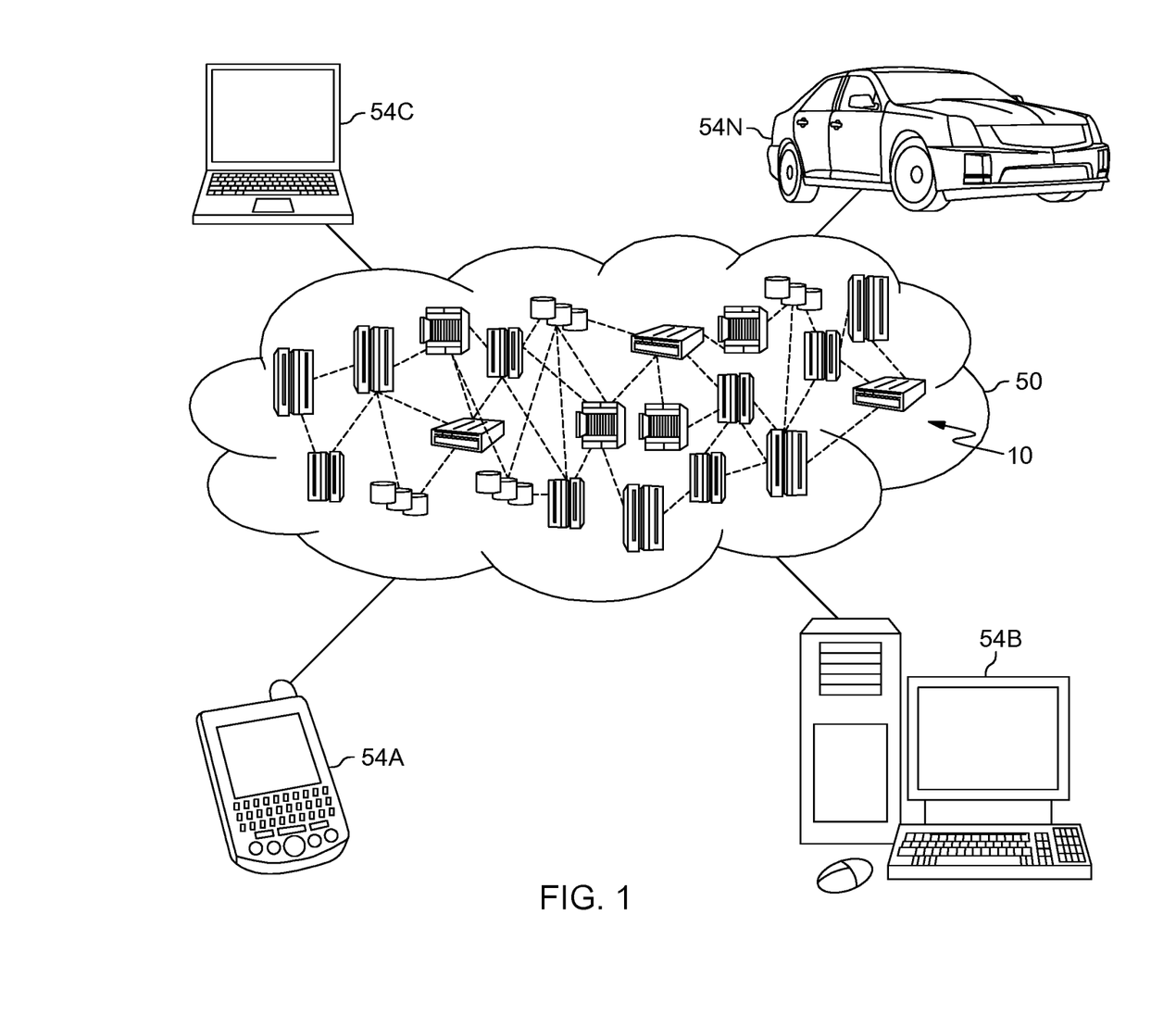
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local internet of things (IOT) devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local IOT device. It is understood that the types of IOT devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
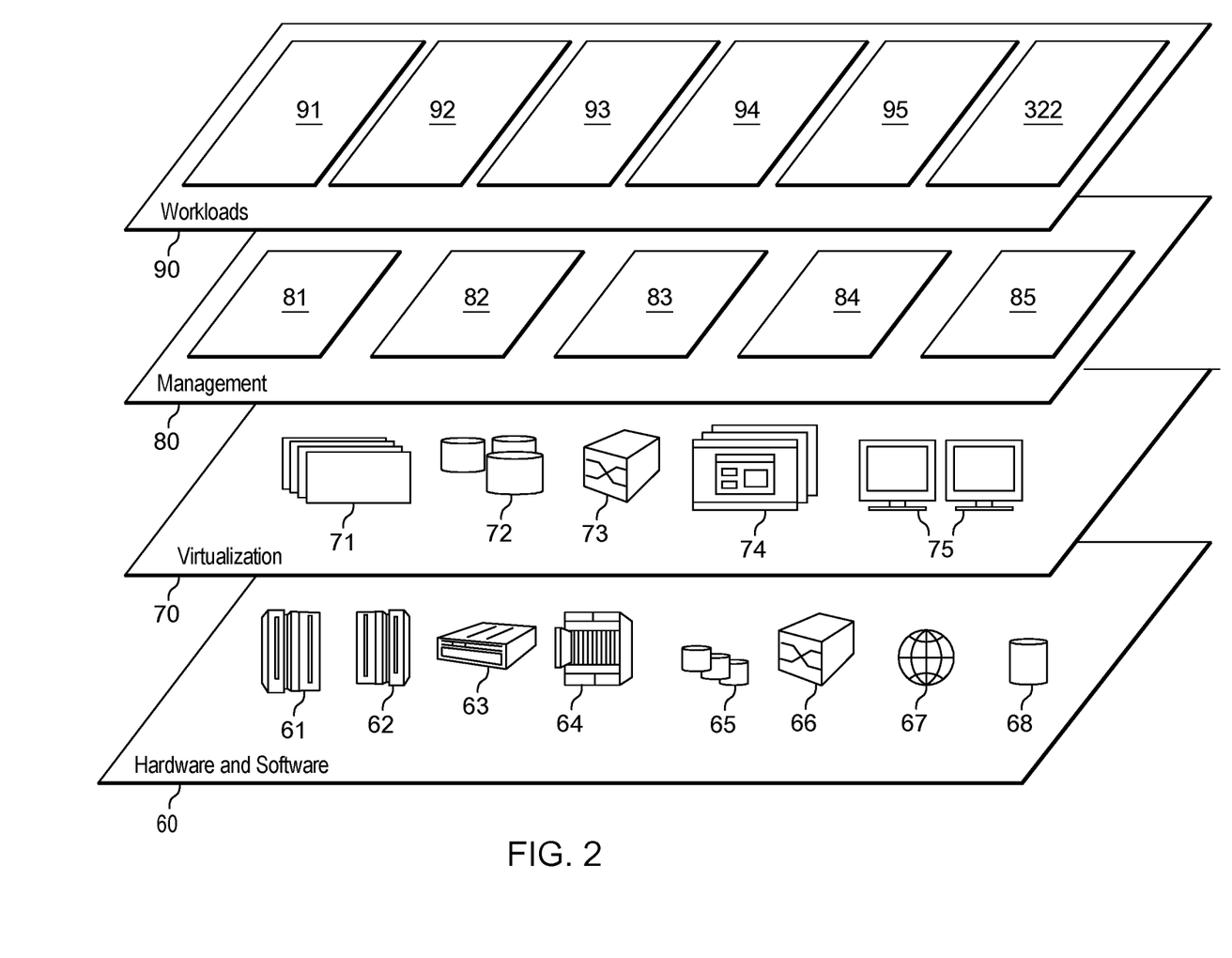
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and media file synchronization component (MFSC) 322.

Figure 3:
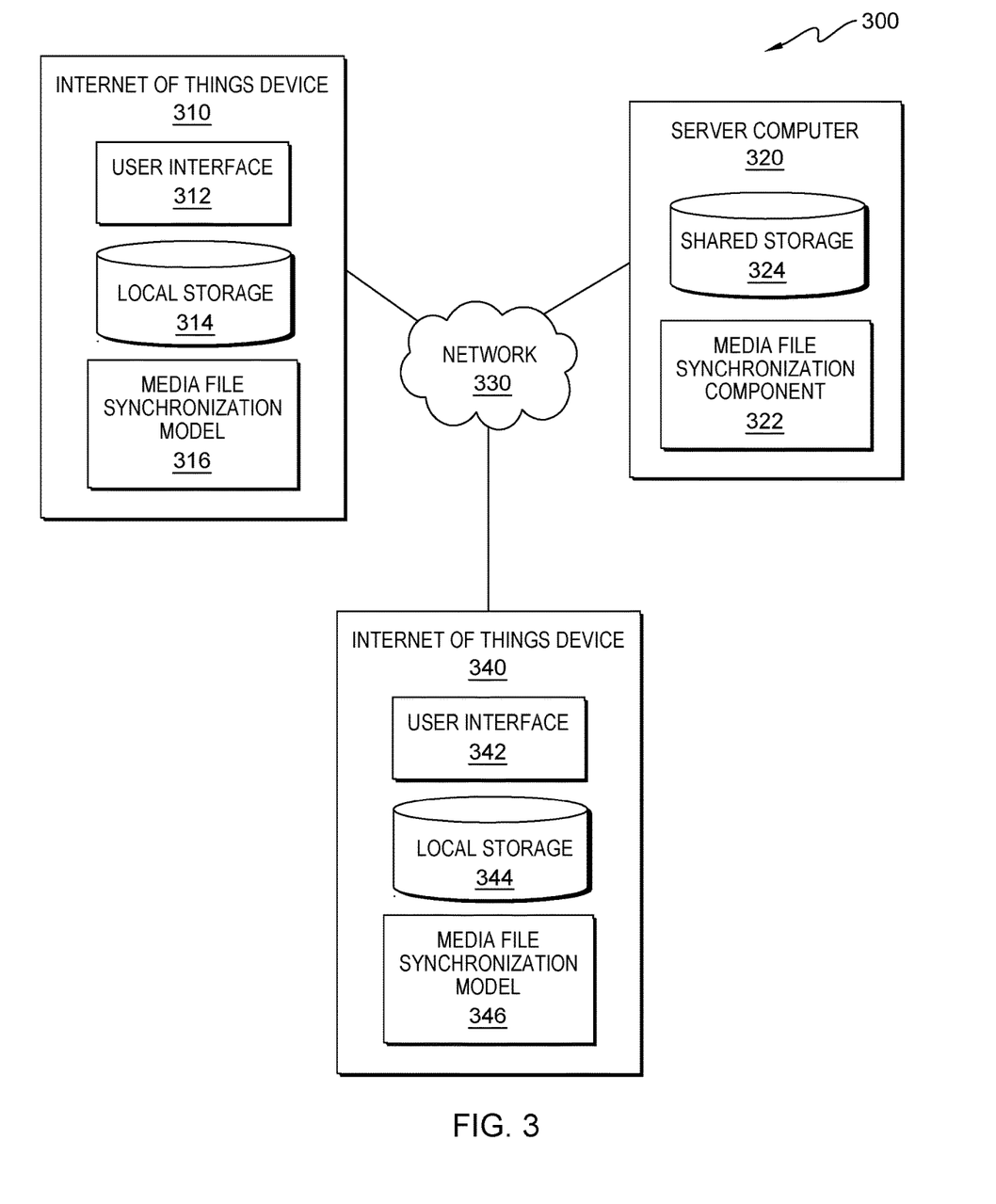
FIG. 3 is a functional block diagram illustrating a distributed data processing environment, in accordance with an embodiment of the present invention.

FIG. 3 is a functional block diagram illustrating distributed data processing environment 300, in accordance with an embodiment of the present invention. Distributed data processing environment 300, can be a cloud computing environment similar to environment 50 in FIG. 1, and includes IOT device 310, IOT device 340, and server computer 320 interconnected over network 330. In various embodiments, not depicted in FIG. 3, environment 300 can include one or more cameras, in which the one or more cameras are in communication with IOT device 310, IOT device 340, and server computer 320, via network 330.

Network 330 can be, for example, a storage area network (SAN), a telecommunications network, a local area network (LAN), a wide area network (WAN), such as the internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and can include wired, wireless, or fiber optic connections. Network 330 can include one or more wired or wireless networks that can receive and transmit data, voice, and/or video signals, including multimedia signals that include voice, data, text and/or video information.

In general, network 330 can be any combination of connections and protocols that will support communications between IOT device 310, MFSC 322, shared storage 324, and server computer 320, and any other IOT devices and/or storage devices (not shown in FIG. 3) within distributed data processing environment 300. FIG. 3 provides only an illustration of one implementation and does not imply any limitations with regard to the environments in which different embodiments can be implemented. Many modifications to the depicted environment can be made by those skilled in the art without departing from the scope of the invention as recited by the claims.

In various embodiments, IOT device 310 and IOT device 340 can each be, but are not limited to, a standalone device, a client, a server, a laptop computer, a tablet computer, a netbook computer, a personal computer (PC), a smart phone, a desktop computer, a smart television, a smart watch, a radio, a stereo system, and/or any programmable electronic IOT device capable of communicating with various components and devices within distributed data processing environment 300, via network 330 or any combination therein. In general, IOT device 310 and IOT device 340 can each be representative of any programmable IOT device or a combination of programmable IOT devices capable of executing machine-readable program instructions and communicating with users of other IOT devices via network 330 and/or capable of executing machine-readable program instructions and communicating with server computer 320. In various embodiments, distributed data processing environment 300 can comprise a plurality of IOT devices.

In other embodiments, IOT device 310 and IOT device 340 can each represent any programmable electronic IOT device, computing device, or combination of programmable electronic IOT devices or computing devices capable of executing machine readable program instructions, manipulating executable machine-readable instructions, and communicating with server computer 320 and other IOT devices (not shown) within distributed data processing environment 300 via a network, such as network 330. In the depicted embodiment, IOT device 310 includes an instance of user interface (UI) 312, local storage 314 and media file synchronization module (MFSM) 316. In the depicted embodiment, IOT device 340 includes instances of UI 342, local storage 344, and MFSM 346. In various embodiments, not depicted in FIG. 3, IOT device 310 and IOT device 340 can each comprise one or more cameras and one or more microphones (e.g., audio recording devices). In various embodiments, the one or more cameras can be low light cameras. In other embodiments, the one or more cameras can be any type of camera known in the art. In other embodiments, not depicted in FIG. 3, distributed data processing environment 300 can comprise one or more IOT devices, one or more server computers, and/or one or more networks. IOT device 310 and IOT device 340 can each include internal and external hardware components, as depicted, and described in further detail with respect to FIG. 5.

User interface (UI) 312 provides an interface to MFSC 322 on server computer 320 via network 330 for a user of IOT device 310. IOT device 310, via UI 312, can enable a user or a client to interact with MFSM 316, IOT device 340, and/or server computer 320 in various ways, such as sending program instructions, receiving program instructions, sending and/or receiving messages, updating data, sending data, inputting data, editing data, collecting data, and/or receiving data. In one embodiment, UI 312 can be a graphical user interface (GUI) or a web user interface (WUI) and can display text, documents, web browser windows, user options, application interfaces, and instructions for operation. UI 312 can include information (such as graphic, text, and sound) a program presents to a user and control sequences the user employs to control the program. In another embodiment, UI 312 can be a mobile application software providing an interface between a user of IOT device 310 and server computer 320. Mobile application software, or an "app," can be a computer program designed to run on smart phones, tablet computers and other IOT devices. In an embodiment, UI 312 can enable the user of IOT device 310 to send data, input data, edit data (annotations), collect data and receive data.

User interface (UI) 342 provides an interface to MFSC 322 on server computer 320 via network 330 for a user of IOT device 340. IOT device 340, via UI 342, can enable a user and/or a client to interact with MFSM 346, IOT device 310, and/or server computer 320 in various ways, such as sending program instructions, receiving program instructions, sending and/or receiving messages, updating data, sending data, inputting data, editing data, collecting data, and/or receiving data. In one embodiment, UI 342 can be a graphical user interface (GUI) or a web user interface (WUI) and can display text, documents, web browser windows, user options, application interfaces, and instructions for operation. UI 342 can include information (such as graphic, text, and sound) a program presents to a user and control sequences the user employs to control the program. In another embodiment, UI 342 can be a mobile application software providing an interface between a user of IOT device 340 and server computer 320. Mobile application software, or an "app," can be a computer program designed to run on smart phones, tablet computers and other IOT devices. In an embodiment, UI 342 can enable the user of IOT device 340 to send data, input data, edit data (annotations), collect data and receive data.

In the depicted embodiment, MFSM 316 operates on IOT device 310. In other embodiments, MFSM 316 can operate anywhere within distributed data processing environment 300 as long as MFSM 316 is still in communication with at least one of IOT device 310, IOT device 340, MFSC 322 or server computer 320. In the depicted embodiment, MFSM 346 operates on IOT device 340. In other embodiments, MFSM 346 can operate anywhere within distributed data environment 300 as long as MFSM 346 is still in communication with at least one of IOT device 310, IOT device 340, MFSC 322 or server computer 320. In the depicted embodiment, MFSM 316 and MFSM 346 are local mobile components of MFSC 322. In various embodiments, MFSM 316 and MFSM 346 can each send, receive, and/or retrieve data (e.g., program settings, audio files, image files, video files, and/or any other type of media file known in the art) from MFSC 322 and from each other. In various embodiments, one or more IOT devices in distributed data processing environment 300 can comprise local mobile components of MFSC 322. In various embodiments MFSM 316 and MFSM 346 can each identify one or more mobile devices within a predetermine distance. In various embodiments, the user of a mobile device (e.g., IOT device 310 or IOT device 340) can establish a maximum distance MFSM 316 and/or MFSM 346 are enabled to look for, or be found by, other IOT devices, via program settings. In various embodiments, program settings enable a user to enable or disable access to the user's mobile device.

In various embodiments, MFSM 316 and MFSM 346 can each enable one or more IOT devices to access the IOT device each MFSM 316 and MFSM 346 operate on, respectively. For example, MFSM 316 operates on a tennis players smartwatch and MFSM 346 operates on an audience members cellphone. In this particular example, MFSM 346 requests permission to access a microphone on a smartwatch from MFSM 316 (i.e., MFSM 346 requests to pair with IOT device 310). In this particular example, MFSM 316 has been enabled by the tennis player (i.e., the user) to enable microphone access to other IOT devices (i.e., IOT device 310 has been enabled to pair with other IOT devices). In this particular example, MFSM 316 grants permission to MFSM 346, via a response accepting MFSM 346 request for access (i.e., MFSM 316 accepts pairing request from MFSM 346 on IOT device 340). In this particular example, MFSM 346 is enabled to access recorded audio, live audio, via microphone access on IOT device 310 and MFSM 346 stores the audio recorded by the microphone on the smartwatch to local storage 344. In various embodiments, MFSM 316 and/or MFSM 346 can enable microphone access to retrieve audio for a predetermined amount of time. For example, enabling a first user's smartphone to access a second user's smartwatch for one minute. In a different example, MFSM 316 enables microphone access to IOT device 340 until IOT device 340 finishes recording a video, at which time MFSM 316 disconnects with IOT device 340.

In various embodiments, MFSM 316 and MFSM 346 can each pair to one or more IOT devices. In various embodiments, MFSM 316 and MFSM 346 can each enable a user to preview the audio quality of one or more other IOT devices. For example, there are four other IOT devices on an open network ready and enabled to pair with a first users IOT device. In this particular example, the first user can sample the audio quality of the other IOT devices one at a time. In some embodiments, a user can sample the sound before pairing with the other device, via temporary pairing (e.g., pairing for a predetermined amount of time before timing out and prompting the user to pair or cancel pairing).

Server computer 320 can be a management server, a web server, a mobile IOT device, one or more client servers, or any other electronic device or computing system capable of receiving, sending, and processing data. In other embodiments, server computer 320 can represent a server computing system utilizing multiple computers such as, but not limited to, a server system, such as in a cloud computing environment. In another embodiment, server computer 320 can represent a computing system utilizing clustered computers and components (e.g., database server computers, application server computers, etc.) that act as a single pool of seamless resources when accessed within distributed data processing environment 300. Server computer 320 can include internal and external hardware components, as depicted, and described in further detail with respect to FIG. 5.

Each of shared storage 324, local storage 344, and local storage 314 can each be a data/knowledge repository and/or a database that can be written to and/or read by one or a combination of MFSC 322, server computer 320, IOT device 340, and/or IOT device 310. In the depicted embodiment, shared storage 324 resides on server computer 320, local storage 344 resides on IOT device 340, and local storage 314 resides on IOT device 310. In another embodiment, shared storage 324, local storage 344, and local storage 314 can each reside elsewhere within distributed data processing environment 300, provided that each can access and is accessible by IOT device 310, IOT device 340, MFSC 322 and/or server computer 320. Shared storage 324, local storage 344 and local storage 314 can each be implemented with any type of storage device capable of storing data and configuration files that can be accessed and utilized by server computer 320, such as a database server, a hard disk drive, or a flash memory.

In other embodiments, shared storage 324, local storage 344, and local storage 314 can each be a hard drive, a memory card, a computer output to laser disc (cold storage), and/or any form of data storage known in the art. In some embodiments, shared storage 324 and/or local storage 314 can each be one or more cloud storage systems and/or databases linked to a cloud network. In various embodiments, shared storage 324 can access, store, and/or house media files and audio files shared throughout distributed date processing environment 300 (e.g., shared data memory).

In various embodiments, MFSC 322 is executed on server computer 320. In some embodiments, MFSC 322 can be located and/or executed anywhere within distributed data processing environment 300 provided that MFSC 322 can communicate with at least one of IOT device 310, IOT device 340, server computer 320, MFSM 316, or MFSM 346, via network 330. In various embodiments, MFSC 322 can receive and retrieve data from MFSM 316 and MFSM 346. In various embodiments, MFSC 322 can identify one or more IOT devices, via MFSM 316 and/or MFSM 346. In some embodiments, MFSC 322 can enable MFSM 316 and MFSM 346 to each identify one or more IOT devices. In various embodiments, MFSC 322 can communicate with MFSM 316 and/or MFSM 346 to store program settings established by the user. In various embodiments, MFSC 322 can take the program settings into consideration when searching, identifying, or connecting to other IOT devices.

In various embodiments, MFSC 322 can receive a request from MFSM 316 and/or MFSM 346 to search for IOT devices that comprise open and enabled microphones within a predetermined area or distance. In various embodiments, MFSC 322 can check for and identify one or more IOT devices within a predetermined area or distance of the IOT device that originally submitted the request to search and identify one or more second IOT devices with available audio sources. In various embodiments, MFSC 322 can enable the pairing of the of a first IOT device (e.g., IOT device 310) to a second IOT device (e.g., IOT device 340). In other embodiments MFSC 322 can enable the pairing of a first IOT device to one or more second IOT devices. In various embodiments, MFSC 322 can enable MFSM 316 to pair IOT device 310 to IOT device 340, additionally, MFSC 322 can enable MFSM 346 to pair IOT device 340 to IOT device 310.

In various embodiments, pairing can be done using a plurality of wireless methods such as, but not limited to:

Long Range (LoRa) digital wireless data communication technology, network 330, Mesh Networks, fourth generation of broadband cellular network (4G), fifth generation of broadband cellular network (5G), opt-in discovery (e.g., an open network), and/or any other method known in the art. In some embodiments, MFSC 322 can retrieve previously paired IOT device permission agreements to re-pair a first IOT device to a second IOT device. In some embodiments, MFSC 322 can search and identify one or more IOT devices in an opt-in open network. In various embodiments, MFSC 322 can enable a first IOT device to access a second IOT device's microphone. In some embodiments, MFSC 322 can access the microphone of the second IOT device.

In various embodiments, MFSC 322 can capture one or more media files on a first IOT device (e.g., IOT device 310). In various embodiments, MFSC 322 can automatically capture one or more media files on a first IOT device and can initiate audio recording on a second IOT device (e.g., IOT device 340). In various embodiments, MFSC 322 can extract audio files from a crowdsourced database. In some embodiments, MFSC 322 can enable the recording of audio on the second IOT device in real-time. In various embodiments, MFSC 322 can receive and/or aggregate one or more media files from one or more IOT devices (e.g., IOT 310 and IOT 340). In various embodiments, MFSC 322 can synchronized the received and/or aggregated one or more media files. In various embodiments, MFSC 322 can synchronize the media file capturing on the first IOT device and the audio recording on the second IOT device from start to finish. In other embodiments, MFSC 322 can synchronize one or more media files and one or more audio files for a predetermined amount of time.

In various embodiments, MFSC 322 can process the aggregated one or more media files either locally or by cloud. For example, in local processing, IOT device 310 captures a video and retrieves the synchronized audio file from IOT device 340. In this particular example, MFSM 316 pairs IOT device 310 with IOT device 340, in which MFSM 316 records a video without audio on IOT device 310 and MFSM 346 records audio on IOT device 340. In this particular example, MFSM 316 receives the audio file from MFSM 346 and combines the audio file and video file on IOT device 310 by embedding the audio file onto the video file. In a different example, in cloud processing, MFSM 316 pairs IOT device 310 with IOT device 340, in which MFSM 316 records a video without audio on IOT device 310 and MFSM 346 records audio on IOT device 340. In this particular example, MFSM 316 uploads the video file to a cloud server and MFSM 346 uploads the audio file to a cloud server. In this particular example, MFSC 322 retrieves the audio file and video file from the cloud server and embeds the audio file into the video file. In this particular example, MFSC 322 outputs a media file comprising the both the audio file and video file. In other embodiments, MFSM 316 and MFSM 346 send the audio files and video files to MFSC 322.

In one particular example, during a lecture, one dedicated device records a professor's lecture for the day. In this particular example, in order to clarify the sound in the recording (e.g., negating the shuffling of papers, or coughing neighbors disrupting the critical junctures in a lecture), users use MFSC 322 to develop a one to many relationship, in which one person (e.g., a student) captures the video while the professor's IOT watch records the audio of the lecture. In this particular example, MFSC 322 shares the assembled content (synchronized and embedded audio and video file) with a predetermined group of users (e.g., content consumers) such as other students in the lecture hall.

In another particular example, a first user is at the beach and taking photographs of nearby activities on the water, and the first user sees a seaplane, a kayaker, and a swimmer all whom happen to be wearing IOT devices. In this particular example, the IOT devices are open and eligible participants in a crowdsource platform. In this particular example, a first user pairs and accesses audio from the seaplane, the kayaker, and the swimmer individually (e.g., one at a time). In this particular example, the first user takes some photographs of the activities on the beach (e.g., the seaplane flying, the swimmer swimming, and the kayaker paddling) using a first IOT device (e.g., IOT device 310). In this particular example, MFSC 322, via MFSM 316, embeds the audio files into each photograph respectively. In this particular example, MFSM outputs photographs with embedded audio, in which when a user presses the photo, the audio file is played. In other examples, the first user pairs and accesses audio from the seaplane, the kayaker, and the swimmer simultaneously.

In various embodiments, MFSC 322 can save the captured media files on shared storage 324, in which shared storage 324 is accessible to a plurality of users. In various embodiments, MFSC 322 enables users to store, access, and retrieve a plurality of media files from shared storage 324. In various embodiments, MFSC 322 enables a user to select one or more media files from shared storage 324 to have processed. For example, a group of users are at a concert, in which the users upload audio, photograph, and video files to shared storage 324 via MFSC 322. In this particular example, a user in the front row wants to photograph of the entire venue (e.g., crowd and stage) using the audio recorded in the front row. In this particular example, the user in the front row can access shared storage 324 via MFSC 322 and select the photo the entire venue uploaded a user siting all the way in the back of the venue on the lawn.

Figure 4:
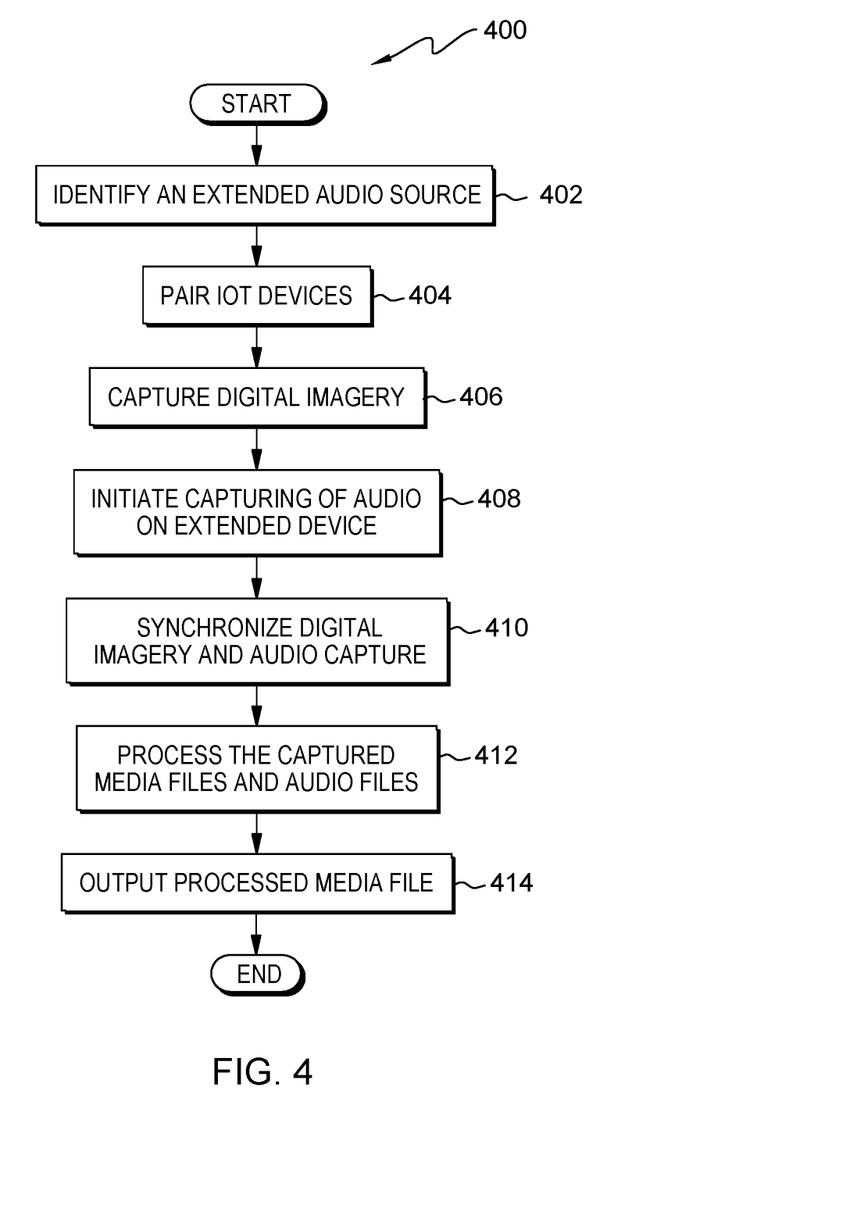
FIG. 4 is a flowchart illustrating operational steps of a media file synchronization component, in communication with a server computer within the distributed data processing environment of FIG. 3, for improving the recording and sharing of media files through crowdsourcing, in accordance with an embodiment of the present invention.

FIG. 4 illustrates operational steps of MFSC 322, generally designated 400, in communication with server computer 320 within distributed data processing environment 300 of FIG. 3, for improving crowdsource recording and sharing of media files, in accordance with an embodiment of the present invention. FIG. 4 provides an illustration of one implementation and does not imply any limitations with regard to the environments in which different embodiments can be implemented. Many modifications to the depicted environment can be made by those skilled in the art without departing from the scope of the invention as recited by the claims.

In step 402, MFSC 322 identifies an extended audio source on a second IOT device. In various embodiments, MFSC 322 can identify one or more extended audio sources on one or more other IOT devices, via MFSM 316 and/or MFSM 346. For example, a user wants to video record a golf putt; however, the user is by the tee box and is unable to record the sound of the putt (e.g., the sound of the club hitting the golf ball and the golf ball going into the hole). In this particular example, the user activates MFSC 322, via MFSM 316 on IOT device 310. In this particular example, MFSM 316 searches for a second IOT device in the area to pair. In various embodiments, the IOT devices can be on an open network, enabled to accept other IOT devices, and/or any other form of discoverability known in the art. In the particular example shown above, MFSM 316 identifies that the golfer is wearing a smartwatch (e.g., IOT device 340), which is enabled to be discovered and enabled to pair with other IOT devices.

In step 404, MFSC 322 pairs IOT devices. In various embodiments, MFSC 322 can pair one or more IOT devices, via MFSM 316 and/or MFSM 346. For example, based on the example above, IOT device 310 (e.g., the first user's smartphone) pairs with IOT device 340 (e.g., the golfer's smartwatch).

In step 406, MFSC 322 captures digital imagery. In various embodiments, MFSC 322 can take one or more photographs and/or videos without audio (i.e., digital imagery), via a first IOT device (e.g., IOT device 310 or IOT device 340). For example, a video without audio is taken on IOT device 310 (e.g., the first user's smartphone).

In step 408, MFSC 322 initiates the capturing of audio on a second IOT device (i.e., extended device). In various embodiments, MFSC 322 can initiate the audio recording on one or more second IOT devices. Continuing the example above, MFSC 322 initiates audio recording on the golfer's smartwatch (i.e., IOT device 340), via MFSM 346. In various embodiments, MFSC 322 can activate audio capture on the second IOT device when digital imagery is being captured on the first IOT device.

In step 410, MFSC 322 synchronizes digital imagery and audio capture. In various embodiments, MFSC 322 can synchronize the audio capture with the digital imagery capture. In various embodiments, MFSC 322 can synchronize one or more audio captures with one or more digital imagery capture. For example, continuing the example above, MFSC 322 synchronizes the audio recording on the golfer's smartwatch with the video being recorded on the first user's smartphone, via MFSM 316 and MFSM 346 coordinating recording time. In various embodiments, MFSC 322 can synchronize by initiating the video and audio recording simultaneously, instructing the microphone to record audio at a predetermined time, and/or any other form of video and audio synchronization known in the art. In various embodiments, the captured digital imagery is stored as a media file and the captured audio is stored as an audio file.

In step 412, MFSC 322 processes the captured media files and audio files. In various embodiments, MFSC 322 can process the one or more captured media files and the one or more captured audio files. For example, continuing the example above, MFSC 322 receives the video file from the first user's smartphone, via MFSM 316, and the audio file from the golfer's smartwatch, via MFSM 346. In this particular example, MFSM 322 integrates the audio file and video file by embedding the audio file onto the video file. In various embodiments, the processing of the captured audio and the captured media files can be done locally or by cloud.

In step 414, MFSC 322 outputs a processed media file. In various embodiments, MFSC 322 can output one or more copies of the processed media file, in which, in this particular example, the processed media file comprises an audio file and a video file. In various embodiments, MFSC 322 can output the file to one or more IOT devices. Continuing the example above, MFSC 322 outputs the processed file to the first user, via MFSM 316. In other embodiments, MFSC 322 can store the audio file, media file, and/or processed media file on an open source network for other users to access.

It should be noted that, in some embodiments, the first IOT device can be a IOT video capture device and the second IOT device can be one or more IOT extended audio devices.

Figure 5:
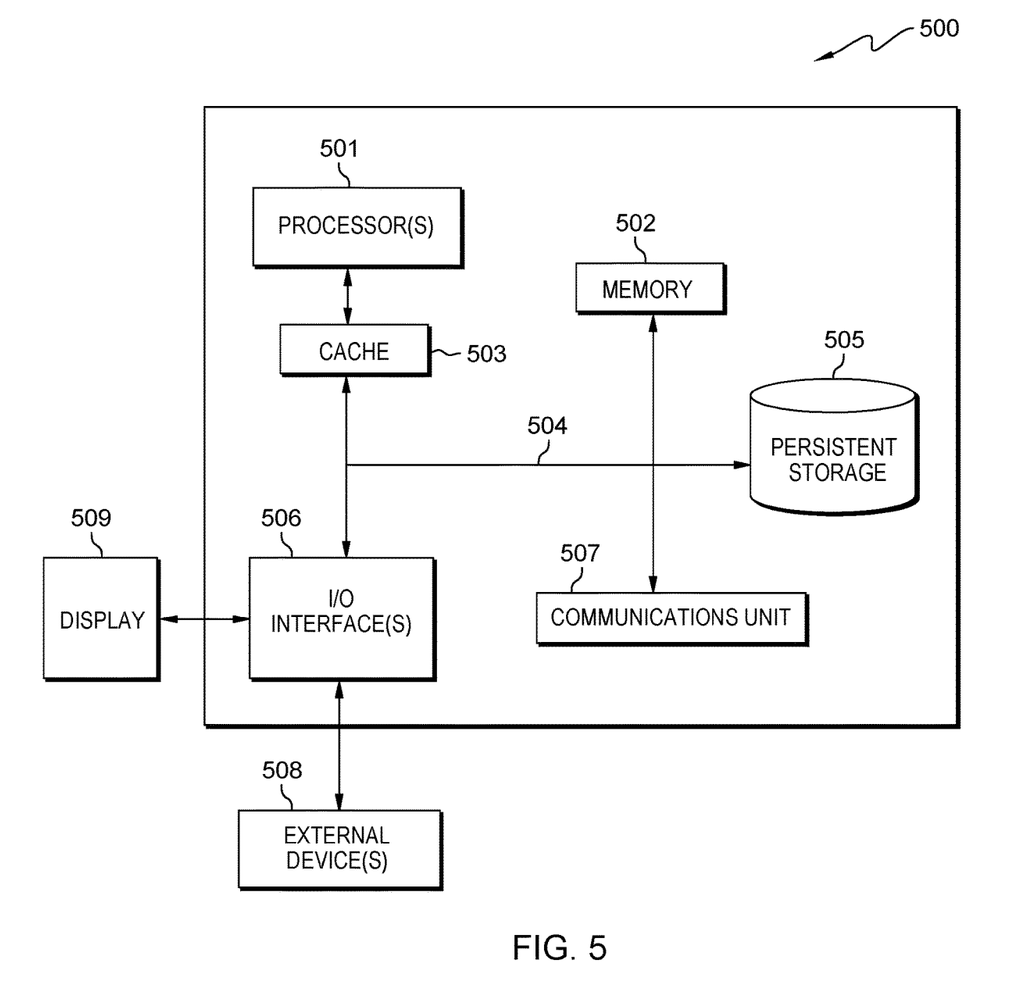
FIG. 5 depicts a block diagram of components of the server computer executing the media file synchronization component within the distributed data processing environment of FIG. 3 in accordance with an embodiment of the present invention.

FIG. 5 depicts computer system 500, where IOT device 310, server computer 320, and IOT device 320 represents an example of computer system 500 that includes MFSC 322. The computer system includes processors 501, cache 503, memory 502, persistent storage 505, communications unit 507, input/output (I/O) interface(s) 506, display 509, external device(s) 508 and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications, and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processors 501 by holding recently accessed data, and data near recently accessed data, from memory 502.

Program instructions and data used to practice embodiments of the present invention can be stored in persistent storage 505 and in memory 502 for execution by one or more of the respective processors 501 via cache 503. In an embodiment, persistent storage 505 includes a magnetic hard disk drive. Alternatively, or in addition to a magnetic hard disk drive, persistent storage 505 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 505 can also be removable. For example, a removable hard drive can be used for persistent storage 505. Other examples include optical and magnetic disks, thumb drives, and smart cards that are inserted into a drive for transfer onto another computer readable storage medium that is also part of persistent storage 505.

Communications unit 507, in these examples, provides for communications with other data processing systems or devices. In these examples, communications unit 507 includes one or more network interface cards. Communications unit 507 can provide communications through the use of either or both physical and wireless communications links. Program instructions and data used to practice embodiments of the present invention can be downloaded to persistent storage 505 through communications unit 507.

I/O interface(s) 506 enables for input and output of data with other devices that can be connected to each computer system. For example, I/O interface 506 can provide a connection to external devices 508 such as a keyboard, keypad, a touch screen, and/or some other suitable input device. External devices 508 can also include portable computer readable storage media such as, for example, thumb drives, portable optical or magnetic disks, and memory cards. Software and data used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product. The computer program product can include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, a segment, or a portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for crowdsource recording and sharing of media files, the method comprising:
    identifying, by one or more processors, one or more extended audio sources that are enabled to be found within a predetermined maximum distance established by a user, wherein the one or more extended audio sources are one or more internet of things (JOT) extended audio devices;
    enabling, by temporary pairing, a preview of audio quality of one or more IOT devices, wherein temporary pairing comprises:
        pairing, by the one or more processors, for a predetermined amount of time before timing out and prompting the user to pair or cancel the pairing;
    pairing, by the one or more processors, an IOT video capture device with the one or more IOT extended audio devices, wherein previously paired IOT device permission agreements are retrieved to re-pair the IOT video capture device to the one or more IOT extended audio devices;
    synchronizing, by the one or more processors, an audio recording on the one or more IOT extended audio devices with digital imagery capture on the IOT video capture device;
    saving, by the one or more processors, the captured digital imagery as one or more media files and the recorded audio as one or more audio files;
    processing, by the one or more processors, the one or more media files and the one or more audio files by integrating the one or more audio files into the one or more media files to create assembled content; and
    outputting, by the one or more processors, the processed one or more media files to the IOT video capture device.

2. The method of claim 1, further comprising:
    capturing, by the one or more processors, the digital imagery on the IOT video capture device; and
    activating, by the one or more processors, the audio recording on the IOT extended audio device.

3. The method of claim 1, wherein pairing further comprises enabling a user to sample audio from the one or more IOT extended audio devices.

4. The method of claim 1, wherein processing further comprises processing the one or more media files and one or more audio files either locally or by cloud.

5. The method of claim 1, wherein pairing further comprises enabling the IOT video capture device or the one or more IOT extended audio devices to opt-in for discovery.

6. The method of claim 1, further comprising:
    accessing, by the one or more processors, an audio recording device on the one or more IOT extended audio devices for a predetermined amount of time.

7. The method of claim 1, wherein the one or more processed media file is one or more videos with embedded audio or one or more images with embedded audio.

8. A computer program product for crowdsource recording and sharing of media files, the computer program product comprising:
    one or more computer readable storage devices and program instructions stored on the one or more computer readable storage devices, the stored program instructions comprising:
    program instructions to identify one or more extended audio sources that are enabled to be found within a predetermined maximum distance established by a user, wherein the one or more extended audio sources are one or more internet of things (JOT) extended audio devices;
    program instructions to enable, by temporary pairing, a preview of audio quality of one or more IOT devices, wherein temporary pairing comprises:
        program instructions to pair for a predetermined amount of time before timing out and prompting the user to pair or cancel the pairing;
    program instructions to pair an IOT video capture device with the one or more IOT extended audio devices, wherein previously paired IOT device permission agreements are retrieved to re-pair the IOT video capture device to the one or more IOT extended audio devices;
    program instructions to synchronize an audio recording on the one or more IOT extended audio devices with digital imagery capture on the IOT video capture device;
    program instructions to save the captured digital imagery as one or more media files and the recorded audio as one or more audio files;
    program instructions to process the one or more media files and the one or more audio files by integrating the one or more audio files into the one or more media files to create assembled content; and
    program instructions to output the processed one or more media files to the IOT video capture device.

9. The computer program product of claim 8, further comprising:
    program instructions to capture the digital imagery on the IOT video capture device; and
    program instructions to activate the audio recording on the IOT extended audio device.

10. The computer program product of claim 8, wherein pairing further comprises enabling a user to sample audio from the one or more IOT extended audio devices.

11. The computer program product of claim 8, wherein processing further comprises processing the one or more media files and one or more audio files either locally or by cloud.

12. The computer program product of claim 8, wherein pairing further comprises enabling the IOT video capture device or the one or more IOT extended audio devices to opt-in for discovery.

13. The computer program product of claim 8, further comprising:
    program instructions to access an audio recording device on the one or more IOT extended audio devices for a predetermined amount of time.

14. The computer program product of claim 8, wherein the one or more processed media file is one or more videos with embedded audio or one or more images with embedded audio.

15. A computer system for crowdsource recording and sharing of media files, the computer system comprising:
  one or more computer processors; one or more computer readable storage devices;
  program instructions stored on the one or more computer readable storage devices for execution by at least one of the one or more computer processors, the stored program instructions comprising:
  program instructions to identify one or more extended audio sources that are enabled to be found within a predetermined maximum distance established by a user, wherein the one or more extended audio sources are one or more internet of things (JOT) extended audio devices;
  program instructions to enable, by temporary pairing, a preview of audio quality of one or more IOT devices, wherein temporary pairing comprises:
    program instructions to pair for a predetermined amount of time before timing out and prompting the user to pair or cancel the pairing;
  program instructions to pair an IOT video capture device with the one or more IOT extended audio devices, wherein previously paired IOT device permission agreements are retrieved to re-pair the IOT video capture device to the one or more IOT extended audio devices;
  program instructions to synchronize an audio recording on the one or more IOT extended audio devices with digital imagery capture on the IOT video capture device;
  program instructions to save the captured digital imagery as one or more media files and the recorded audio as one or more audio files;
  program instructions to process the one or more media files and the one or more audio files by integrating the one or more audio files into the one or more media files to create assembled content; and
  program instructions to output the processed one or more media files to the IOT video capture device.

16. The computer system of claim 15, further comprising:
  program instructions to capture the digital imagery on the IOT video capture device; and
  program instructions to activate the audio recording on the IOT extended audio device.

17. The computer system of claim 15, wherein pairing further comprises enabling a user to sample audio from the one or more IOT extended audio devices and enabling the IOT video capture device or the one or more IOT extended audio devices to opt-in for discovery.

18. The computer system of claim 15, wherein processing further comprises processing the one or more media files and one or more audio files either locally or by cloud.

19. The computer system of claim 15, further comprising:
  program instructions to access an audio recording device on the one or more IOT extended audio devices for a predetermined amount of time.

20. The computer system of claim 15, wherein the one or more processed media file is one or more videos with embedded audio or one or more images with embedded audio.

* * * * *